(12) United States Patent
Kobayashi et al.

(10) Patent No.: US 8,525,810 B2
(45) Date of Patent: Sep. 3, 2013

(54) SIGNAL PROCESSING DEVICE OF TOUCH PANEL

(75) Inventors: Kazuyuki Kobayashi, Midori (JP);
Tatsuya Suzuki, Kumagaya (JP);
Kumiko Fukai, Gunma (JP); Yasuhiro Kaneta, Isesaki (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 810 days.

(21) Appl. No.: 12/652,334

(22) Filed: Jan. 5, 2010

(65) Prior Publication Data
US 2010/0171723 A1 Jul. 8, 2010

(30) Foreign Application Priority Data

Jan. 7, 2009 (JP) .................................. 2009-001246
Dec. 8, 2009 (JP) .................................. 2009-278505

(51) Int. Cl.
*G06F 3/045* (2006.01)
(52) U.S. Cl.
USPC .......................... 345/174; 345/173; 178/18.01
(58) Field of Classification Search
USPC ..................... 345/173–179; 178/18.01–18.04
See application file for complete search history.

(56) References Cited

U.S. PATENT DOCUMENTS

| 4,291,303 | A | * | 9/1981 | Cutler et al. ................... 345/174 |
| 5,189,417 | A | * | 2/1993 | Caldwell et al. ................ 341/26 |
| 2006/0261963 | A1 | * | 11/2006 | Giles et al. .................... 340/604 |
| 2009/0040193 | A1 | * | 2/2009 | Geaghan ....................... 345/174 |

FOREIGN PATENT DOCUMENTS

JP 2005-190950 7/2005

* cited by examiner

*Primary Examiner* — Kimnhung Nguyen
(74) *Attorney, Agent, or Firm* — McDermott Will & Emery LLP

(57) ABSTRACT

There is offered a signal processing device of touch panel using an electrostatic capacity, which realizes improvement in noise tolerance and linear detection. An excitation pad, a first touch pad and a second touch pad are disposed on a substrate in a way that the excitation pad is interposed between the first and second touch pads. On the other hand, an alternating current power supply that provides the excitation pad with an alternating voltage through a wiring is provided on a sensor IC side of the signal processing device of touch panel. Also, there is provided an electric charge amplifier. The first touch pad is connected to a non-inverting input terminal (+) of the electric charge amplifier through an wiring, while the second touch pad is connected to an inverting input terminal (−) of the electric charge amplifier through a wiring.

19 Claims, 11 Drawing Sheets

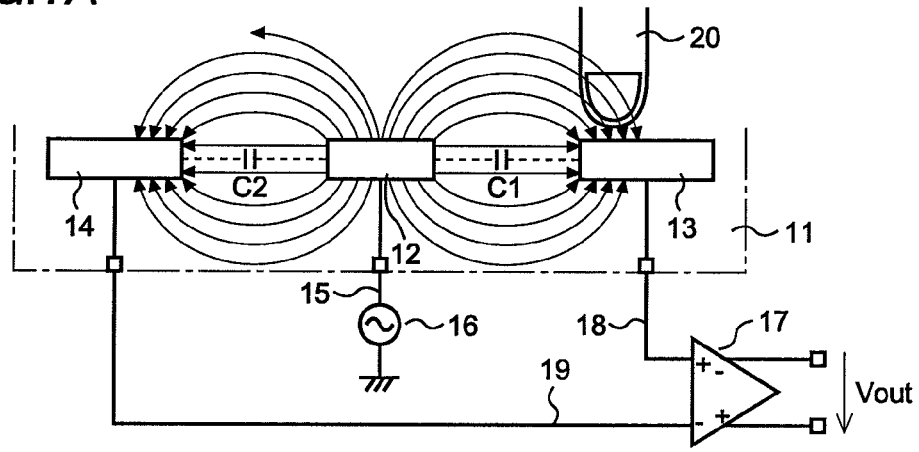
FIG. 1A  CA1 > CA2
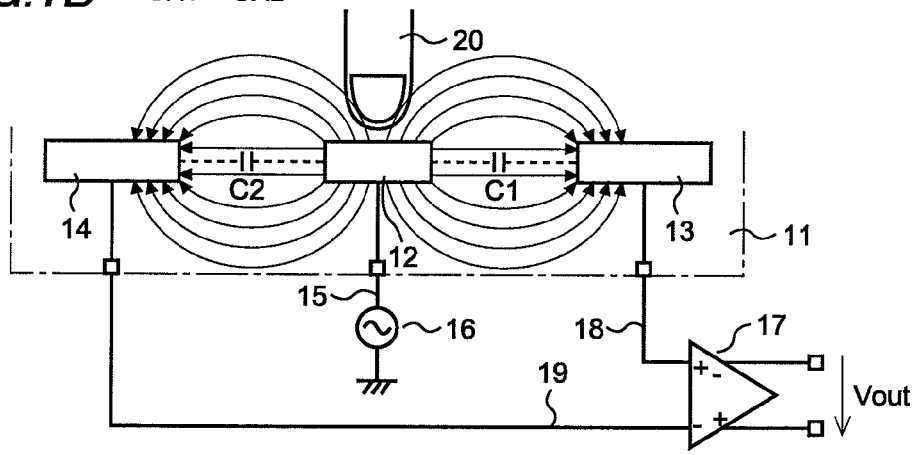
FIG. 1B  CA1 = CA2
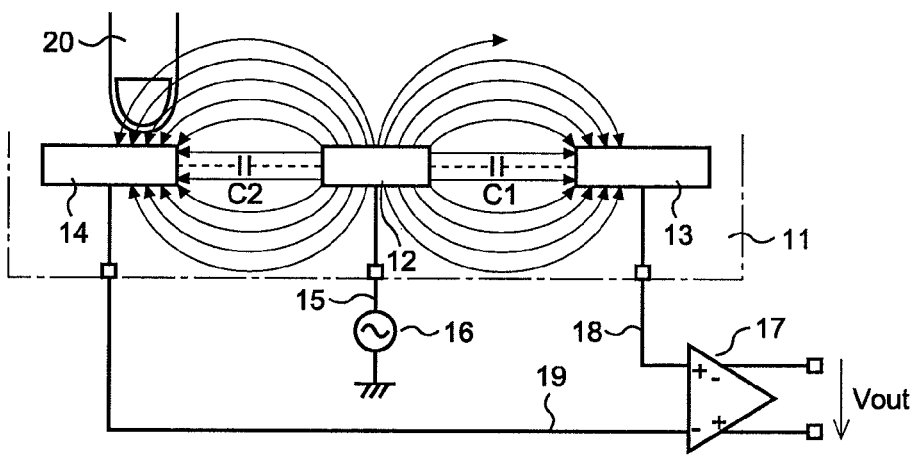
FIG. 1C  CA1 < CA2

CHARGE ACCUMULATION MODE

CHARGE TRANSFER MODE

# US 8,525,810 B2

SIGNAL PROCESSING DEVICE OF TOUCH PANEL

CROSS-REFERENCE OF THE INVENTION

This application claims priority from Japanese Patent Application Nos. 2009-001246 and 2009-278505, the contents of which are incorporated herein by reference in their entireties.

BACKGROUND OF THE INVENTION

1. Field of the Invention

This invention relates to a signal processing device of a touch panel, specifically to a signal processing device of a touch panel using an electrostatic capacity.

2. Description of the Related Art

An electrostatic capacity type input device called a touch sensor or the like has been known as an input device to various kinds of electronic devices such as mobile phones, portable audio devices, portable game consoles, televisions and personal computers. This kind of touch sensor is disclosed in Japanese Patent Application Publication No. 2005-190950, for example.

A conventional touch sensor (signal processing device of a touch panel) is described referring to FIGS. 9 and 10. A touch pad 51 is formed on a PCB (Printed Circuit Board) substrate 50 so that an electrostatic capacitor 52 (capacitance C) is formed between the touch pad 51 and the PCB substrate 50, as shown in FIG. 9. The touch pad 51 is connected to a non-inverting input terminal (+) of a comparator 53 through a wiring 54. A reference voltage Vref is applied to an inverting input terminal (−) of the comparator 53. A constant current power supply 55 is connected to the wiring 54 that connects the touch pad 51 and the non-inverting input terminal (+) of the comparator 53.

Operations of the touch sensor are described referring to FIG. 10. When a finger 56 of an operator is far away from the touch pad 51, a capacitance attached to the touch pad 51 is C. In this case, a voltage at the touch pad 51 increases from 0 V in a reset state as the electrostatic capacitor 52 is charged with a constant current from the constant current power supply 55. An output voltage of the comparator 53 is inverted when the voltage at the touch pad 51 reaches the reference voltage Vref. A length of time from the reset state to the inversion of the comparator 53 in this case is referred to as t1.

When the finger 56 of the operator approaches the touch pad 51, on the other hand, the capacitance associated with the touch pad 51 increases to C+C'. The increment C' is a capacitance of a capacitor formed between the finger 56 of the operator and the touch pad 51. As a result, the length of time that the voltage at the touch pad 51 takes from 0 V to the reference voltage Vref increases to t2 (t2>t1). Which means it is possible to detect whether the finger 56 of the operator has touched or not based on a difference (t2−t1) in the length of time required for the transition from the reset state to the inversion of the comparator 53. In other words, the touch pad 51 functions as an ON/OFF switch for data input.

In the conventional touch sensor, however, there is a problem that the voltage at the touch pad 51 is varied to cause malfunctioning of the touch sensor when a noise is applied to the touch pad 51.

In addition, an amount of data that can be inputted is limited because the touch pad 51 serves as a binary switch having an ON state and an OFF state.

SUMMARY OF THE INVENTION

The invention provides a signal processing device of touch panel. The touch panel includes a first touch pad, a second touch pad and an excitation pad disposed between the first touch pad and the second touch pad. The signal processing device includes an alternating current power supply providing the excitation pad with an alternating voltage, and an electric charge amplifier generating a voltage corresponding to a difference between a first capacitance of a first capacitor formed between the first touch pad and the excitation pad and a second capacitance of a second capacitor formed between the second touch pad and the excitation pad.

BRIEF DESCRIPTION OF THE DRAWINGS

FIGS. 1A, 1B and 1C show a structure of a signal processing device of a touch panel according a first embodiment of this invention.

DETAILED DESCRIPTION OF THE INVENTION

Figure 2:
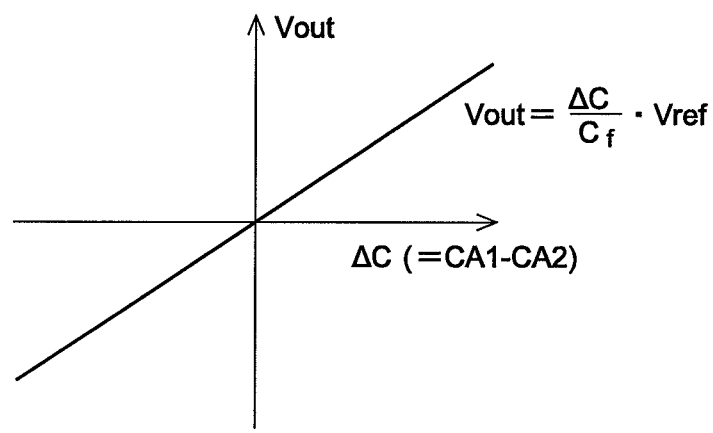
FIG. 2 shows input-output characteristics of an electric charge amplifier according to the first embodiment of this invention.

Signal processing devices of touch panels according to embodiments of this invention will be described referring to the drawings.

First, a signal processing device of a touch panel according to a first embodiment of this invention will be described referring to FIGS. 1A, 1B, 1C and 2. The first embodiment is related to fundamental principles of this invention, which are also used in other embodiments to be described later.

An excitation pad 12, a first touch pad 13 and a second touch pad 14 are disposed on a substrate 11 (an example of the touch panel) such as a PCB substrate, in a way that the excitation pad 12 is interposed between the first and second touch pads 13 and 14. A dielectric layer (not shown) is formed between the excitation pad 12 and each of the first and second touch pads 13 and 14. That is, a first electrostatic capacitor C1 is formed of the excitation pad 12 and the first touch pad 13. Similarly, a second electrostatic capacitor C2 is formed of the excitation pad 12 and the second touch pad 14. The first electrostatic capacitor C1 has a capacitance CA1, while the second electrostatic capacitor C2 has a capacitance CA2. It is preferable that the capacitances CA1 and CA2 are set to be equal to each other in an initial state. Since the excitation pad 12 and the first and second touch pads 13 and 14 are electrodes, it is preferable that surfaces of these electrodes are covered with an insulator such as plastic, wood or rubber.

An alternating current power supply 16 that provides the excitation pad 12 with an alternating voltage through a wiring 15 is provided on a sensor IC side (signal processing device side) of the input device. Amplitude of the alternating voltage is referred to as an excitation voltage Vref. Also, there is provided an electric charge amplifier 17. The first touch pad 13 is connected to a non-inverting input terminal (+) of the electric charge amplifier 17 through an wiring 18, while the second touch pad 14 is connected to an inverting input terminal (−) of the electric charge amplifier 17 through a wiring 19.

The electric charge amplifier 17 generates a voltage corresponding to a difference between the capacitance CA1 of the capacitor C1 formed between the excitation pad 12 and the first touch pad 13 and the capacitance CA2 of the capacitor C2 formed between the excitation pad 12 and the second touch pad 14.

Figure 11:
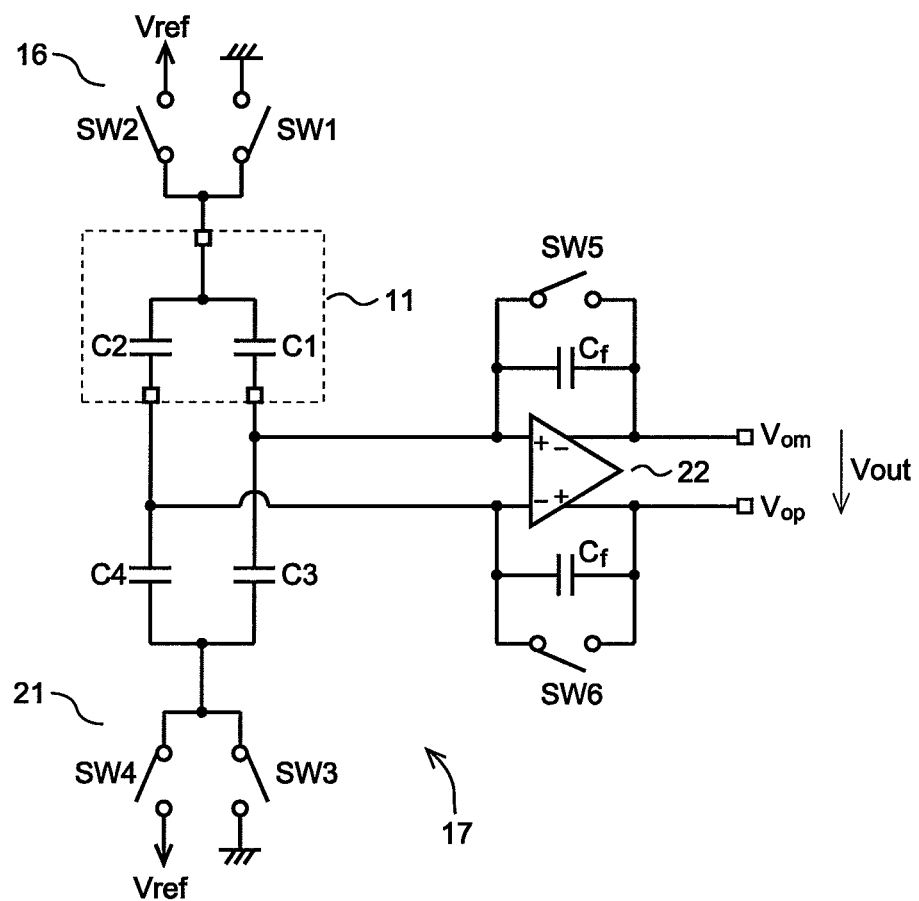
FIG. 11 is an equivalent circuit diagram of the signal processing device of the touch panel including an electric charge amplifier.
Figure 12A:
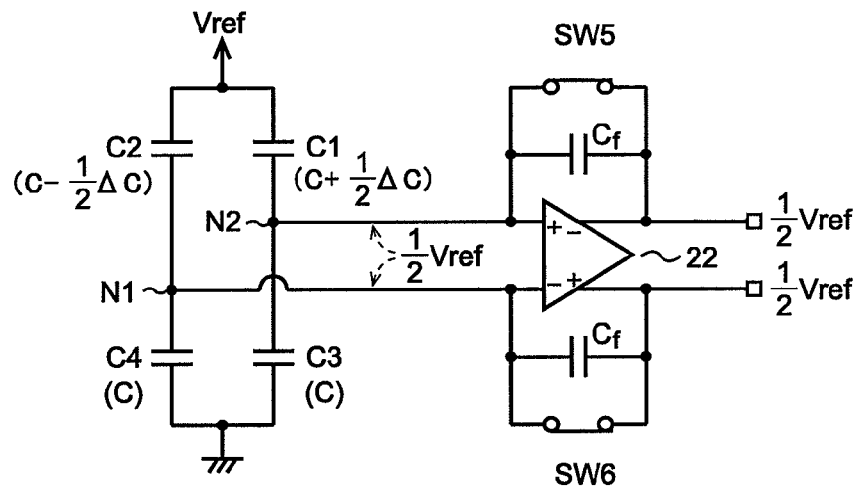
FIGS. 12A and 12B are circuit diagrams to explain the operations of the signal processing device of the touch panel including the electric charge amplifier.
Figure 12B:
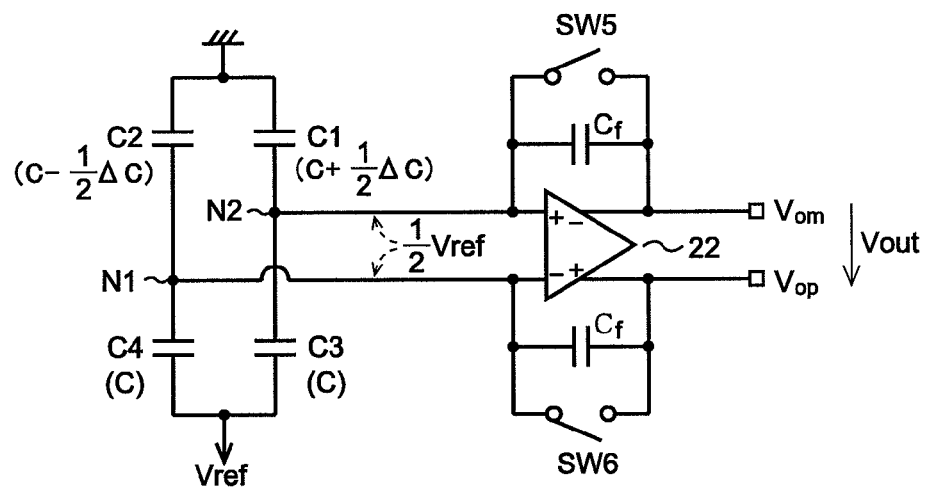

An example of a concrete structure of the electric charge amplifier 17 is described hereafter referring to FIGS. 11, 12A and 12B. The first capacitor C1 and the second capacitor C2 are formed on the substrate 11 that is shown as a portion encircled by a dashed line in FIG. 11. Portions of the structure shown in FIG. 11 except for the substrate 11 make the sensor IC.

The alternating current power supply 16 is formed of switches SW1 and SW2 that are switched alternately. The alternating current power supply 16 outputs the ground voltage (0 V) when the switch SW1 is closed and the switch SW2 is opened, and outputs the excitation voltage Vref (positive voltage) when the switch SW1 is opened and the switch SW2 is closed. In this case, the alternating current power supply 16 outputs a clock signal voltage alternating between Vref (H level) and 0 V (L level).

A third electrostatic capacitor C3 is connected in series with the first electrostatic capacitor C1, while a fourth electrostatic capacitor C4 is connected in series with the second electrostatic capacitor C2. It is preferable that capacitances CA3 and CA4 of the electrostatic capacitors C3 and C4 are equal to each other and approximately equal to or smaller than the capacitances CA1 and CA2. When the capacitances CA3 and CA4 are smaller than the capacitances CA1 and CA2, it is easier to integrate the capacitors C3 and C4 into the sensor IC. In the explanations described below, the capacitances CA3 and CA4 are assumed to be approximately equal to the capacitances CA1 and CA2.

An alternating current power supply 21, that is similar to the alternating current power supply 16, is connected to a connecting node between the third capacitor C3 and the fourth capacitor C4. The alternating current power supply 21 is formed of switches SW3 and SW4 that are switched alternately. The alternating current power supply 21 outputs the ground voltage (0 V) when the switch SW3 is closed and the switch SW4 is opened, and outputs the excitation voltage Vref (positive voltage) when the switch SW3 is opened and the switch SW4 is closed. The alternating current power supply 16 and the alternating current power supply 21 output clock signal voltages that are opposite in phase to each other.

A wiring drawn out from a connecting node N2 between the first and third electrostatic capacitors C1 and C3 is connected to a non-inverting input terminal (+) of an ordinary differential amplifier 22, while a wiring drawn out from a connecting node N1 between the second and fourth electrostatic capacitors C2 and C4 is connected to a inverting input terminal (−) of the differential amplifier 22.

A feedback capacitor Cf is connected between an inverting output terminal (−) and the non-inverting input terminal (+) of the differential amplifier 22, while an identical feedback capacitor Cf is connected between a non-inverting output terminal (+) and the inverting input terminal (−) of the differential amplifier 22. Each of the feedback capacitors Cf has a capacitance CAf.

A switch SW5 is connected between the inverting output terminal (−) and the non-inverting input terminal (+) of the differential amplifier 22, while a switch SW6 is connected between the non-inverting output terminal (+) and the inverting input terminal (−) of the differential amplifier 22. The switches SW5 and SW6 are switched simultaneously. That is, when the switches SW5 and SW6 are closed, the inverting output terminal (−) and the non-inverting input terminal (+) of the differential amplifier 22 are short-circuited while the non-inverting output terminal (+) and the inverting input terminal (−) of the differential amplifier 22 are short-circuited.

A voltage difference between an output voltage Vom from the inverting output terminal (−) of the differential amplifier 22 and an output voltage Vop from the non-inverting output terminal (+) of the differential amplifier 22 is represented by Vout (=Vop−Vom).

Next, operations of the circuit structured as described above will be explained referring to FIGS. 12A and 12B. The circuit has a charge accumulation mode and a charge transfer mode that alternate many times.

In the charge accumulation mode that is shown in FIG. 12A, the excitation voltage Vref is applied to the first and second electrostatic capacitors C1 and C2 by opening the switch SW1 and closing the switch SW2 of the alternating current power supply 16. Also, the ground voltage (0 V) is applied to the third and fourth electrostatic capacitors C3 and C4 by opening the switch SW4 and closing the switch SW3 of the alternating current power supply 21.

Also, the switches SW5 and SW6 are closed. With this, the inverting output terminal (−) and the non-inverting input terminal (+) of the differential amplifier 22 are short-circuited while the non-inverting output terminal (+) and the inverting input terminal (−) are short-circuited.

As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½Vref. Here, ½Vref is a common mode voltage of the differential amplifier 22, which is a half of the excitation voltage Vref.

Next, in the charge transfer mode that is shown in FIG. 12B, the ground voltage (0 V) is applied to the first and second electrostatic capacitors C1 and C2 by closing the switch SW1 and opening the switch SW2 of the alternating current power supply 16. Also, the excitation voltage Vref is applied to the third and fourth electrostatic capacitors C3 and C4 by closing the switch SW4 and opening the switch SW3 of the alternating current power supply 21. Also, the switches SW5 and SW6 are opened.

After that, the circuit returns to the charge accumulation mode, and then turns to the charge transfer mode again. The electric charge amplifier 17 reaches a stable state after repeating the operations described above a multitude of times.

In this case, CA3=CA4=C, where C is a capacitance of each of the capacitors C1 and C2 in the initial state. When a finger 20 of an operator approaches the touch pad 13 or 14, there is caused a capacitance difference ΔC between the capacitances CA1 and CA2. That is, CA1−CA2=ΔC. Then, equations CA1=C+½ΔC and CA2=C−½ΔC hold.

In the charge accumulation mode, $$\text{Amount of Electric Charges at } N1 = \left(C - \frac{1}{2}\Delta C\right)\cdot\left(-\frac{1}{2}V\!ref\right) + C\cdot\left(\frac{1}{2}V\!ref\right) + CAf\cdot 0 \quad \text{[Equation 1]}$$

where $(C-\frac{1}{2}\Delta C)\cdot(-\frac{1}{2}\text{Vref})$ represents an amount of electric charges stored in C2, $C\cdot(\frac{1}{2}\text{Vref})$ represents an amount of electric charges stored in C4 and CAf·0 (=0) represents an amount of electric charges stored in Cf.

In the charge transfer mode, $$\text{Amount of Electric Charges at } N1 = \left(C - \frac{1}{2}\Delta C\right)\cdot\left(\frac{1}{2}V\!ref\right) + C\cdot\left(-\frac{1}{2}V\!ref\right) + CAf\cdot\left(Vop - \frac{1}{2}V\!ref\right) \quad \text{[Equation 2]}$$

where $(C-\frac{1}{2}\Delta C)\cdot(\frac{1}{2}\text{Vref})$ represents an amount of electric charges stored in C2, $C\cdot(-\frac{1}{2}\text{Vref})$ represents an amount of electric charges stored in C4 and CAf·(Vop−½Vref) represents an amount of electric charges stored in Cf.

[Equation 1]=[Equation 2], since the amount of electric charges at N1 in charge accumulation mode is equal to the amount of electric charges at N1 in the charge transfer mode according to the law of conservation of electric charge.

Following equation is obtained by solving [Equation 1]=[Equation 2] for Vop.

$$Vop = \left(1 + \frac{\Delta C}{CAf}\right)\cdot\frac{1}{2}V\!ref \quad \text{[Equation 3]}$$

Similarly, following equation is obtained by applying the law of conservation of electric charge to the electric charges at the node N2 and solving the resulting equation for Vom.

$$Vom = \left(1 - \frac{\Delta C}{CAf}\right)\cdot\frac{1}{2}V\!ref \quad \text{[Equation 4]}$$

Vout is obtained from [Equation 3] and [Equation 4].

$$Vout = Vop - Vom = \frac{\Delta C}{CAf}\cdot V\!ref \quad \text{[Equation 5]}$$

That is, it is understood that the output voltage Vout of the electric charge amplifier 17 varies proportionally to the capacitance difference ΔC between the capacitances CA1 and CA2, as shown in FIG. 2. The signal processing device of the touch panel according to the embodiment of this invention is structured utilizing the principle described above.

A principle of operation of the signal processing device of the touch panel is hereafter explained referring to FIGS. 1A, 1B and 1C. In the following explanation, the capacitances CA1 and CA2, each formed between the excitation pad 12 and each of the first and second touch pads 13 and 14, respectively, are equal to each other, that is CA1=CA2=C, in the initial state in which the finger 20 of the operator is far away from the touch pads 13 and 14. The explanation is given based on a dielectric model in which the finger 20 of the operator is regarded as a dielectric that is electrically floating.

First, when the finger 20 of the operator approaches the first touch pad 13 as shown in FIG. 1A, an electric field between the first touch pad 13 and the excitation pad 12 is varied so that the capacitance CA1 of the capacitor C1 formed between the first touch pad 13 and the excitation pad 12 becomes larger compared with the capacitance CA2 (CA1>CA2).

This is because the number of lines of electric force originating from the excitation pad 12 and terminating at the first touch pad 13 is increased by that the finger 20 of the operator approaches the touch pad 13. In this case, the output voltage Vout of the electric charge amplifier 17 is positive (+) as derived from the equation 5. The same result is obtained when a dielectric such as an eraser approaches the first touch pad 12 instead of the finger 20 of the operator.

When the finger 20 of the operator is placed right above the excitation pad 12 as shown in FIG. 1B, the capacitance CA1 and the capacitance CA2 are equal to each other (CA1=CA2). In this case, the output voltage Vout of the electric charge amplifier 17 is 0 V.

When the finger 20 of the operator approaches the second touch pad 14 as shown in FIG. 1C, an electric field between the second touch pad 14 and the excitation pad 12 is varied so that the capacitance CA2 of the capacitor C2 formed between the second touch pad 14 and the excitation pad 12 becomes larger compared with the capacitance CA1 (CA2>CA1). In this case, the output voltage Vout of the electric charge amplifier 17 is negative (−) as derived from the equation 5.

The signal processing device of the touch panel described above can be used as an ON/OFF switch, since the output voltage Vout of the electric charge amplifier 17 is turned to the positive (+) voltage when the finger 20 of the operator approaches the first touch pad 13. Besides, the output voltage Vout of the electric charge amplifier 17 varies linearly with ΔC. That is, the closer the finger 20 of the operator comes to the first touch pad 13, the larger the positive output voltage Vout becomes, while the closer the finger 20 of the operator comes to the second touch pad 14, the larger an absolute value of the negative output voltage Vout becomes. Therefore, linear detection (analog detection) of a position of the finger 20 of the operator is made possible by utilizing the characteristics described above.

In addition, noise tolerance can be improved with the signal processing device of the touch panel described above, since the differential capacitance detection is adopted. That is, when a noise is applied to the first and second touch pads 13 and 14, an influence of the noise on the first touch pad 13 and an influence of the noise on the second touch pad 14 are cancelled out by each other so that the influence of the noise is suppressed from appearing in the output voltage Vout of the electric charge amplifier 17. Furthermore, since there is no influence of parasitic capacitances of the first and second touch pads 13 and 14 and the wirings 15, 18 and 19, no restriction is required on patterning of the touch pads and the like, enabling arbitrary patterning.

Above explanation is based on the dielectric model in which the finger 20 of the operator is regarded as a dielectric. When the finger 20 of the operator is grounded, on the other hand, an electric field shielding model applies. In this case, the finger 20 of the operator serves to shield the electric field so that the relative size of capacitance of the capacitor C2 to that of the capacitor C1 is reversed.

That is, in the electric field shielding model, when the finger 20 of the operator approaches the first touch pad 13, the number of the lines of electric force originating from the excitation pad 12 and terminating at the first touch pad 13 is decreased because a part of the lines of electric force originating from the excitation pad 12 terminates at the finger 20 of the operator. As a result, the capacitance CA1 becomes smaller than the capacitance CA2 (CA1<CA2).

Which of the dielectric model and the electric field shielding model applies is determined depending on the electrical state of the finger 20 of the operator or its alternative such as a pen or an eraser. However, there is no difference in that the position being touched can be detected by the changes in the capacitances since only difference in the case where the electric field shielding model applies is that the relative size of capacitance of the capacitor C2 to that of the capacitor C1 is reversed. Following explanations are given based on the dielectric model.

A signal processing device of a touch panel according to a second embodiment of this invention is capable of detecting eight or more than eight locations on the touch panel with four inputs, using the principle described above.

Figure 3:
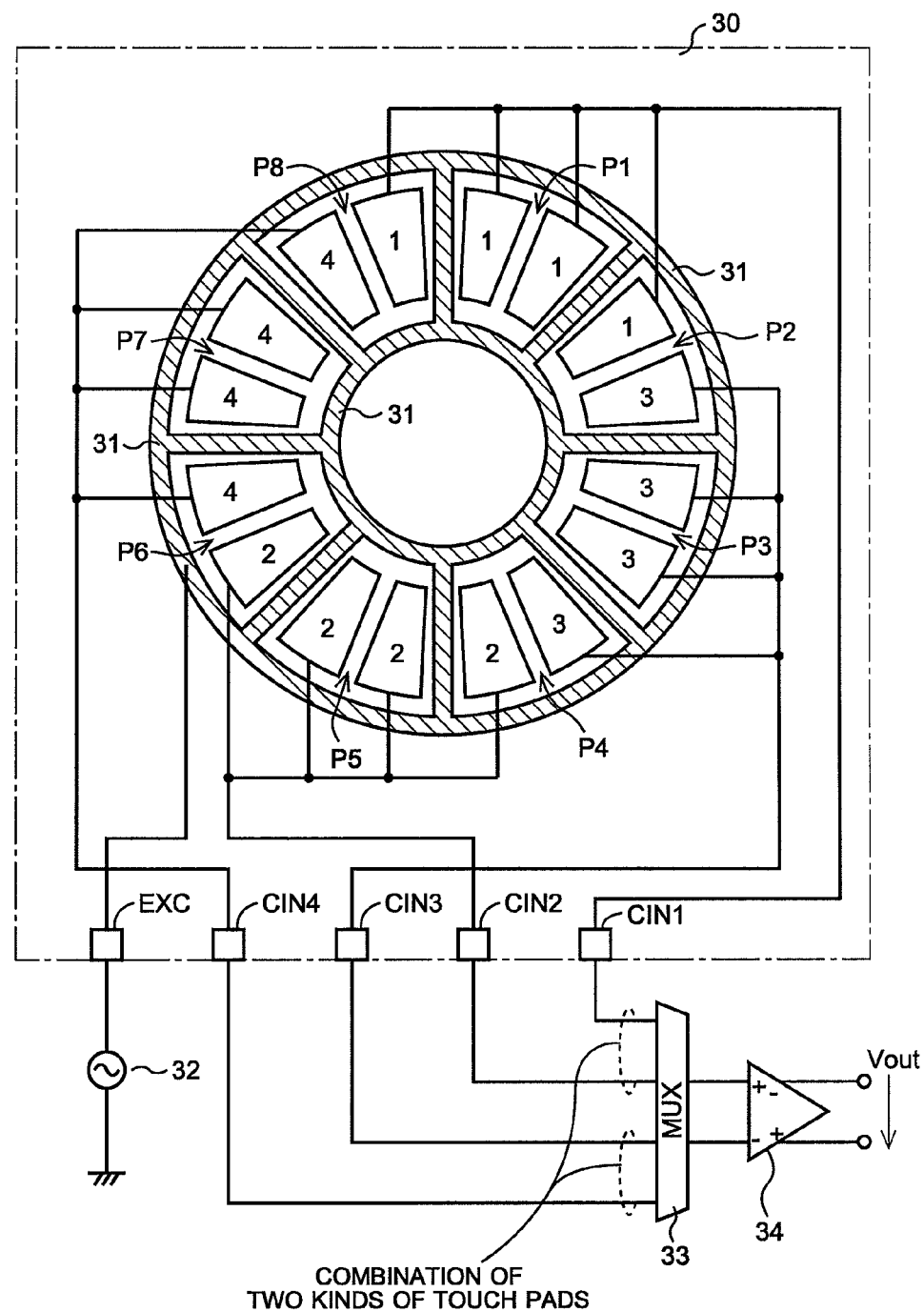
FIG. 3 shows a structure of a signal processing device of a touch panel according a second embodiment of this invention.
Figure 4:
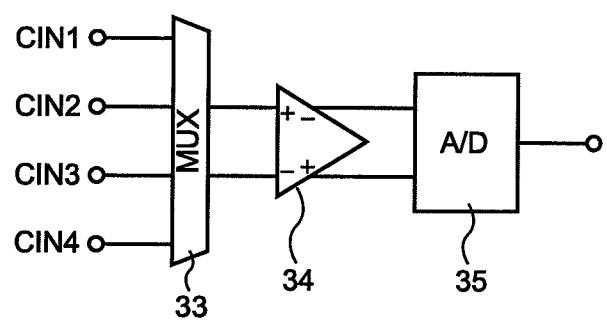
FIG. 4 shows a structure of a sensor IC side of the signal processing device of the touch panel according to the second embodiment of this invention.

First, a structure of the touch panel is described referring to FIG. 3. Four kinds of touch pads (electrodes) 1-4, that are a first kind, a second kind, a third kind and a fourth kind of touch pads, are provided on a substrate 30 such as a PCB substrate. Pairs of touch pads made of one or two kinds of touch pads selected out of the first through fourth kinds of touch pads are arrayed in a ring form.

A first through eighth pairs of touch pads (1, 1), (1, 3), (3, 3), (3, 2), (2, 2), (2, 4), (4, 4), and (4, 1) are formed in an example shown in FIG. 3. The first pair (1, 1) represents a pair composed of the first kind of touch pad 1 and another first kind of touch pad 1, while the second pair (1, 3) represents a pair composed of the first kind of touch pad 1 and the third kind of touch pad 3. Each of the rest of the pairs represents the similar structure.

The pairs of touch pads include pairs of touch pads composed of a single kind of touch pads such as (1, 1), (2, 2), (3, 3) and (4, 4). Each of the pairs of touch pads composed of a single kind of tough pads are depicted as two separate touch pads in the example shown in FIG. 3 so that they have the same shape as the pairs of touch pads composed of two kinds of touch pads. However, the pairs of touch pads composed of a single kind of touch pads may be shaped in a single touch pad. For example, the first pair of touch pads (1, 1) may be composed of a single first kind of touch pad 1.

Each of the first through eighth pairs of touch pads corresponds to each of first through eighth locations P1-P8, respectively. An excitation pad (electrode) 31 is placed between neighboring pairs of touch pads. The first through eighth pairs of touch pads include four each of the first through fourth kinds of touch pads 1-4, as shown in FIG. 3. The same kind of touch pads, for example four first kind of touch pads 1, are connected together with a wiring, and each of the same kinds of touch pads is connected to corresponding each of first through fourth input terminals CIN1-CIN4. The excitation pad 31 is connected to an excitation terminal EXC through a wiring.

Next, a structure of a sensor IC (signal processing circuit side) is described. An alternating current power supply 32 is connected to the excitation terminal EXC and the excitation pad 31 is provided with an alternating voltage. Each of the first through fourth input terminals CIN1-CIN4 is connected to corresponding each of four input terminals of a selection circuit 33. The selection circuit 33 selects between a combination of the first and second kinds of touch pads 1 and 2 and a combination of the third and fourth kinds of touch pads 3 and 4.

An electric charge amplifier 34 is provided in a stage subsequent to the selection circuit 33. The electric charge amplifier 34 is made of the same circuit as the electric charge amplifier 17 in the first embodiment of this invention. That is, the electric charge amplifier 34 generates a voltage corresponding to a difference between a first capacitance of a capacitor formed between the excitation pad 31 and a touch pad of one kind out of the combination of the kinds selected by the selection circuit 33 and a second capacitance of a capacitor formed between the excitation pad 31 and a touch pad of another kind out of the combination of the kinds selected by the selection circuit 33. For example, when the combination of the first and second kinds of touch pads 1 and 2 is selected, the electric charge amplifier 34 generates a voltage corresponding to a difference between a first capacitance of a capacitor formed between the excitation pad 31 and the first kind of touch pad 1 and a second capacitance of a capacitor formed between the excitation pad 31 and the second kind of touch pad 2. Since the electric charge amplifier 34 is made of the same circuit as the electric charge amplifier 17 in the first embodiment, a concrete circuit of the electric charge amplifier 34 is shown in FIGS. 11, 12A and 12B. Therefore, the third capacitor C3 and the fourth capacitor C4 are connected to the selection circuit 33 in the subsequent stage, and each of the connecting nodes is connected to corresponding each of the non-inverting input terminal (+) and the inverting input terminal (−) of the differential amplifier 22, respectively. The connections between the selection circuit 33 and the differential amplifier 22 are the same as described above in the third through sixth embodiments that are to be described.

Operations of the signal processing device of the touch panel described above are explained referring to Table 1.

TABLE 1

| Location of Pair of Touch Pads | Kinds of Touch Pad in Pair of Touch Pads | Output of Electric Charge Amplifier (in Phase 1) | Output of Electric Charge Amplifier (in Phase 2) |
| --- | --- | --- | --- |
| P1 | 11 | + | 0 |
| P2 | 13 | + | + |
| P3 | 33 | 0 | + |
| P4 | 32 | − | + |
| P5 | 22 | − | 0 |
| P6 | 24 | − | − |
| P7 | 44 | 0 | − |
| P8 | 41 | + | − |

The selection circuit 33 is controlled by a control circuit (not shown) so that it selects the combination of the first and second kinds of touch pads 1 and 2 in the first phase (phase 1) and selects the combination of the third and fourth kinds of touch pads 3 and 4 in the subsequent phase (phase 2). When the finger 20 of the operator approaches to the first location P1, that is the first pair of touch pads (1, 1), the combination of the first and second kinds of touch pads 1 and 2 is selected in the phase 1. According to the principle described above, the electric charge amplifier 34 outputs a positive (+) voltage because the capacitance of the capacitor formed between the excitation pad 31 and the first kind of touch pad 1 is increased. In the phase 2, on the other hand, the combination of the third and fourth kinds of touch pads 3 and 4 is selected. In this case, the electric charge amplifier 34 outputs 0 V. This is because the finger 20 of the operator is close to the first pair of touch pads (1, 1) and there is no difference between the capacitance of a capacitor formed between the excitation pad 31 and the third kind of touch pad 3 and a capacitance of a capacitor formed between the excitation pad 31 and the fourth kind of touch pad 4. Therefore, the output of the electric charge amplifier 34 in the phase 1 and the phase 2 is represented as (+, 0).

Next, when the finger 20 of the operator approaches the second location P2, that is the second pair of touch pads (1, 3), a capacitance of a capacitor formed between the excitation pad 31 and the first kind of touch pad 1 is increased in the phase 1 so that the electric charge amplifier 34 outputs a positive (+) voltage. The electric charge amplifier 34 outputs a positive (+) voltage in the phase 2 because a capacitance of a capacitor formed between the excitation pad 31 and the third kind of touch pad 3 is increased. Therefore, the output of the electric charge amplifier 34 in the phase 1 and the phase 2 is represented as (+, +).

Next, when the finger 20 of the operator approaches the third location P3, that is the third pair of touch pads (3, 3), the electric charge amplifier 34 outputs 0V in the phase 1 because there is no difference between corresponding capacitances. The electric charge amplifier 34 outputs a positive (+) voltage in the phase 2 because a capacitance of a capacitor formed between the excitation pad 31 and the third kind of touch pad 3 is increased. Therefore, the output of the electric charge amplifier 34 in the phase 1 and the phase 2 is represented as (0, +).

When the finger 20 of the operator approaches the fourth location P4, that is the fourth pair of touch pads (3, 2), a capacitance of a capacitor formed between the excitation pad 31 and the second kind of touch pad 2 is increased in the phase 1 so that the electric charge amplifier 34 outputs a minus (−) voltage. The electric charge amplifier 34 outputs a positive (+) voltage in the phase 2 because a capacitance of a capacitor formed between the excitation pad 31 and the third kind of touch pad 3 is increased. Therefore, the output of the electric charge amplifier 34 in the phase 1 and the phase 2 is represented as (−, +).

With the consideration as described above, the output of the electric charge amplifier 34 in the phase 1 and the phase 2 is represented as (−, 0) when the finger 20 of the operator approaches the fifth location P5, that is the fifth pair of touch pads (2, 2).

When the finger 20 of the operator approaches the sixth location P6, that is the sixth pair of touch pads (2, 4), the output of the electric charge amplifier 34 in the phase 1 and the phase 2 is represented as (−, −). When the finger 20 of the operator approaches the seventh location P7, that is the seventh pair of touch pads (4, 4), the output of the electric charge amplifier 34 in the phase 1 and the phase 2 is represented as (0, −). When the finger 20 of the operator approaches the eighth location P8, that is the eighth pair of touch pads (4, 1), the output of the electric charge amplifier 34 in the phase 1 and the phase 2 is represented as (+, −).

The eight locations can be detected by the output of the electric charge amplifier 34 in the phase 1 and phase 2 as described above. In other words, the eight locations can be detected with the four inputs CIN1-CIN4. Therefore, the number of input terminals and the number of wirings can be substantially reduced compared with the conventional touch panel. Note that pairs of touch pads (1, 2) and (3, 4) are not used because the output of the electric charge amplifier 34 is undefined in this case and these pairs of touch pads do not function in the differential capacitance detection.

Only three values +, 0 and − are used as the output of the electric charge amplifier 34 in detecting the eight locations as described above. Since the electric charge amplifier 34 outputs the analog voltage corresponding to the capacitance difference ΔC, more locations can be detected using the analog values.

For example, 16 locations can be detected by interpolating the first through eighth locations P1-P8. In this case, an A/D converter 35 may be provided in a stage subsequent to the electric charge amplifier 34 to convert the analog voltage outputted from the electric charge amplifier 34 into digital values and detect a large number of locations based on the digital values.

The pairs of touch pads composed of the four kinds of touch pads are used in the signal processing device of the touch panel according to the second embodiment. Not limited to the above, it is also possible to use pairs of touch pads composed of more than four kinds of touch pads. For example, each pair of touch pads may be composed of one or two kinds of touch pads out of six kinds of touch pads, and the selection circuit 33 may be modified to have six input terminals. In this case, the selection circuit 33 selects each of three combinations composed of two kinds of touch pads in each of three phases 1, 2 and 3, respectively. As a result, 18 locations can be detected with six input terminals. In this case, more than 18 locations can be detected when the linear detection is taken into consideration.

Further, 32 locations can be detected when pairs of eight kinds of touch pads and eight input terminals are used. In this case also, more than 32 locations can be detected when the linear detection is taken into consideration. In general, this invention can be applied to a signal processing device of touch panel having n kinds of touch pads (n is an even integer equal to or larger than four)., and larger number of locations can be detected as the larger number of kinds of touch pads are provided.

Figure 5:
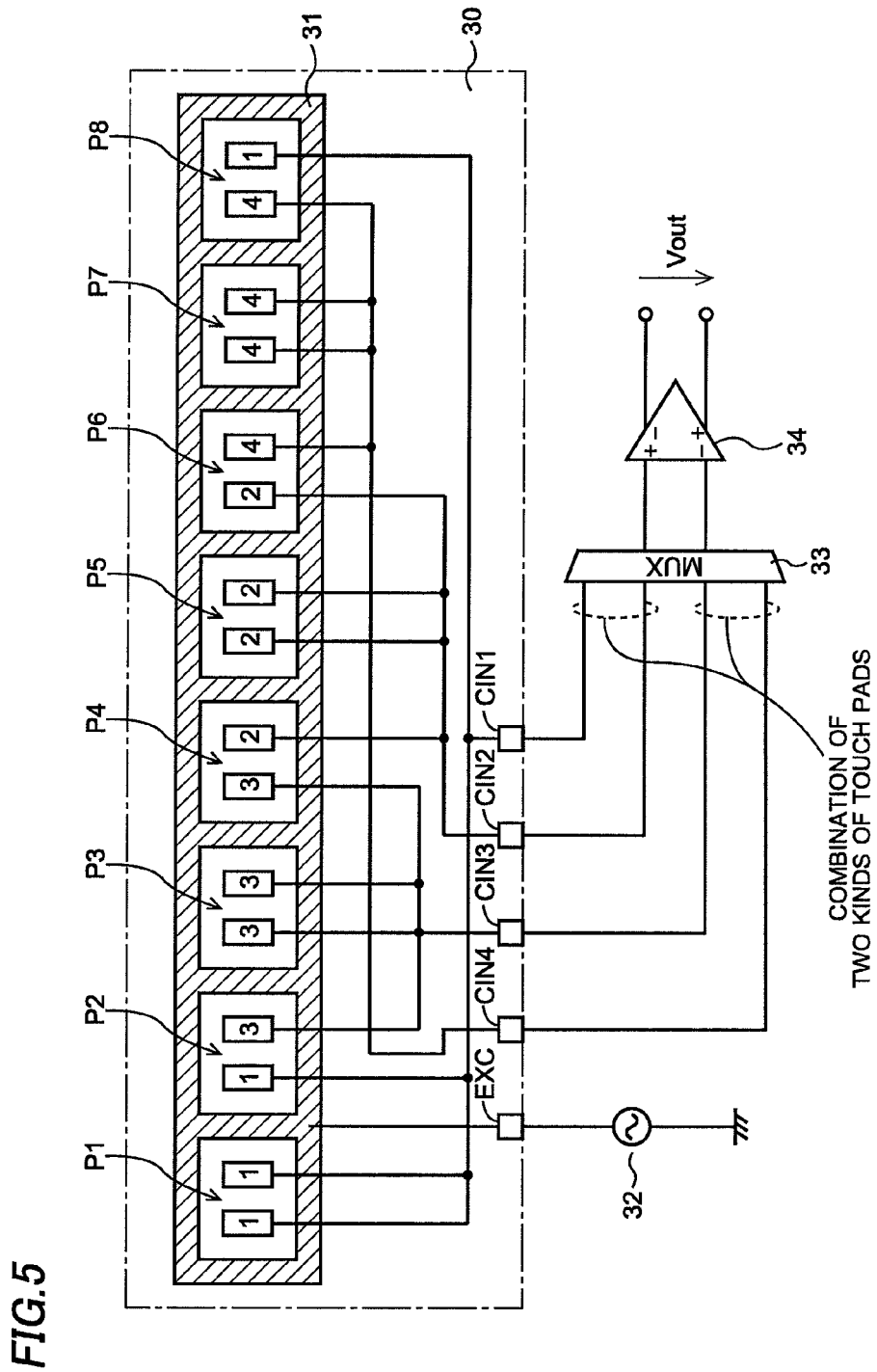
FIG. 5 shows a structure of a signal processing device of a touch panel according a third embodiment of this invention.

The first through eighth pairs of touch pads (1, 1), (1, 3), (3, 3), (3, 2), (2, 2), (2, 4), (4, 4), and (4, 1) are arrayed in a ring form in the signal processing device of touch panel according to the second embodiment of this invention. A signal processing device of touch panel according to a third embodiment of this invention differs from the signal processing device of touch panel according to the second embodiment in that the first through eighth pairs of touch pads (1, 1), (1, 3), (3, 3), (3, 2), (2, 2), (2, 4), (4, 4), and (4, 1) are arrayed in line, as shown in FIG. 5.

Operations of the signal processing device of touch panel according to the third embodiment are the same as the signal processing device of touch panel according to the second embodiment. The signal processing device of touch panel according to the third embodiment is capable of detecting first through eighth locations P1-P8 on the line.

Figure 6:
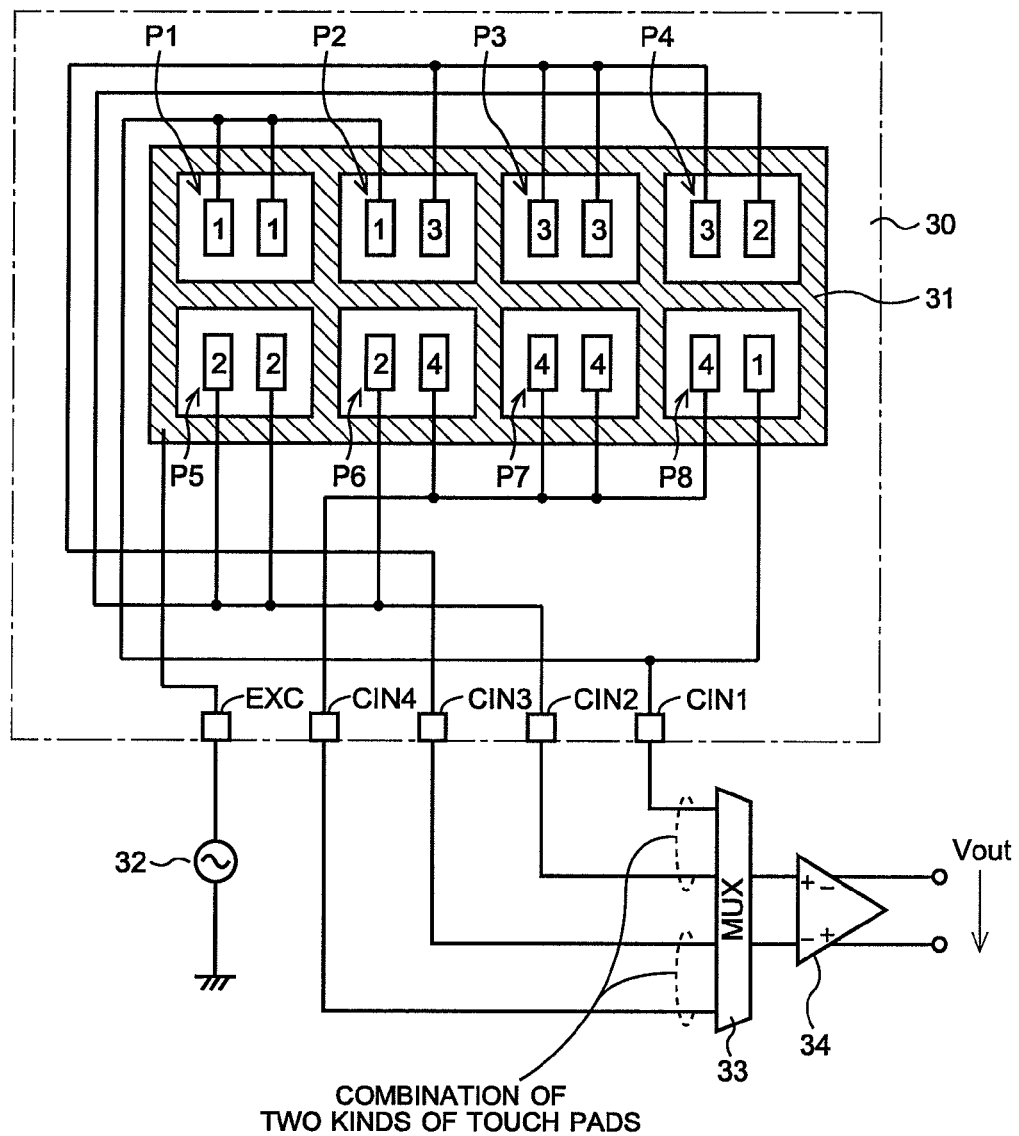
FIG. 6 shows a structure of a signal processing device of a touch panel according a fourth embodiment of this invention.

A signal processing device of touch panel according to a fourth embodiment of this invention differs from the signal processing device of touch panel according to the second embodiment in that the first through eighth pairs of touch pads (1, 1), (1, 3), (3, 3), (3, 2), (2, 2), (2, 4), (4, 4), and (4, 1) are arrayed to form a pattern of matrix, as shown in FIG. 6. Operations of the signal processing device of touch panel according to the fourth embodiment are the same as the signal processing device of touch panel according to the second embodiment. The signal processing device of touch panel according to the fourth embodiment is capable of detecting first through eighth locations P1-P8 on the matrix.

As understood from the explanations given above, a plurality of units each composed of the first through eighth pairs of touch pads (1, 1), (1, 3), (3, 3), (3, 2), (2, 2), (2, 4), (4, 4), and (4, 1) can be arrayed to form an arbitrary pattern.

Next, there is described a signal processing device of touch panel according to a fifth embodiment of this invention that is evolved from the signal processing device of touch panel according to the fourth embodiment and is capable of detecting 64 locations with eight inputs.

Figure 7:
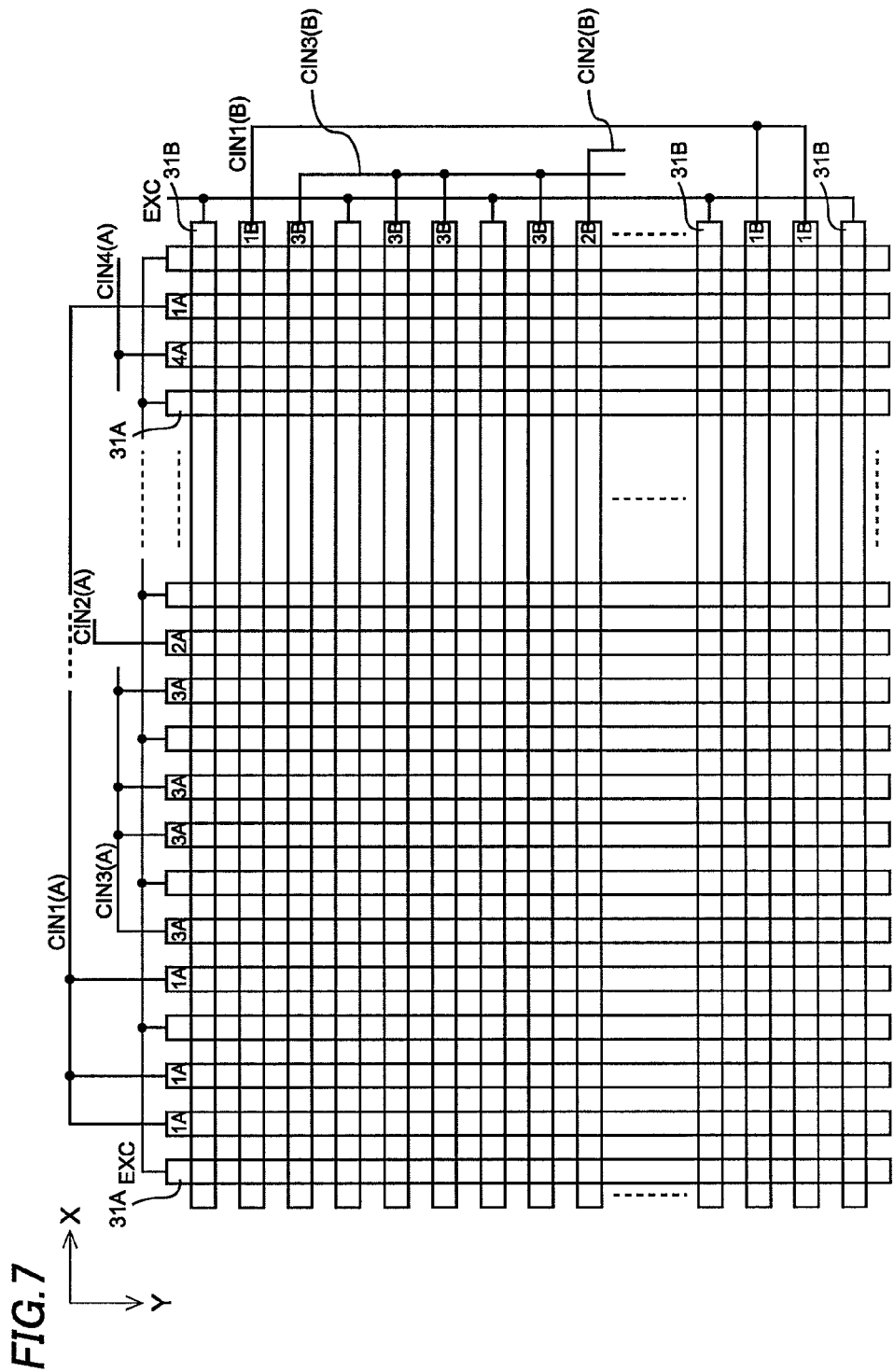
FIG. 7 shows a structure of a signal processing device of a touch panel according a fifth embodiment of this invention.

An array of first through eighth pairs of touch pads (1A, 1A), (1A, 3A), (3A, 3A), (3A, 2A), (2A, 2A), (2A, 4A), (4A, 4A), and (4A, 1A) and excitation pads 31A are disposed parallel to each other and extending in a Y direction on a substrate, as shown in FIG. 7. Each of the excitation pads 31A is placed between neighboring pairs of the touch pads that are extending along the Y direction. The same kind of touch pads, for example four first kind of touch pads 1A, are connected together with a wiring, and each of the same kinds of touch pads is connected to corresponding each of first through fourth input terminals CIN1(A)-CIN4(A). The excitation pads 31A are connected to an excitation terminal EXC through a wiring.

Another array of first through eighth pairs of touch pads (1B, 1B), (1B, 3B), (3B, 3B), (3B, 2B), (2B, 2B), (2B, 4B), (4B, 4B), and (4B, 1B) and excitation pads 31B are disposed parallel to each other and extending in an X direction on the substrate, Each of the excitation pads 31B is placed between neighboring pairs of the touch pads that are extending along the Y direction. The same kind of touch pads, for example four first kind of touch pads 1B, are connected together with a wiring, and each of the same kinds of touch pads is connected to corresponding each of first through fourth input terminals CIN1(B)-CIN4(B). The excitation pads 31B are connected to the excitation terminal EXC through a wiring. Note that some of the touch pads are not shown in FIG. 7 for the sake of convenience.

The array of the first through eighth pairs of touch pads (1A, 1A), (1A, 3A), (3A, 3A), (3A, 2A), (2A, 2A), (2A, 4A), (4A, 4A), and (4A, 1A) and the excitation pads 31A extending in the Y direction are formed of a first wiring layer, for example, and the array of the first through eighth pairs of touch pads (1B, 1B), (1B, 3B), (3B, 3B), (3B, 2B), (2B, 2B), (2B, 4B), (4B, 4B), and (4B, 1B) and the excitation pads 31B extending in the X direction are formed of a second wiring layer, for example. The two arrays intersect each other but electrically insulated from each other. The excitation pads 31A and 31B are electrically connected with each other through via holes.

The array of the first through eighth pairs of touch pads (1A, 1A), (1A, 3A), (3A, 3A), (3A, 2A), (2A, 2A), (2A, 4A), (4A, 4A), and (4A, 1A) and the excitation pads 31A extending in the Y direction is provided with a sensor IC (A) (not shown) structured as described in the second embodiment, while the array of the first through eighth pairs of touch pads (1B, 1B), (1B, 3B), (3B, 3B), (3B, 2B), (2B, 2B), (2B, 4B), (4B, 4B), and (4B, 1B) and the excitation pads 31B extending in the X direction is provided with a sensor IC (B) (not shown) structured as described in the second embodiment.

With the signal processing device of touch panel described above, eight locations in the X direction can be detected by the sensor IC (A), and eight locations in the Y direction can be detected by the sensor IC (B). That is, 8×8=64 locations can be detected in this case. Therefore, the 64 locations can be detected with only eight inputs with the signal processing device of touch panel according to the fifth embodiment of this invention. Furthermore, it is possible to detect more than 64 locations using the analog values outputted from the sensor ICs that perform the linear detection. As a result, the number of the terminals and the number of the wirings on the touch panel can be reduced substantially.

Figure 8:
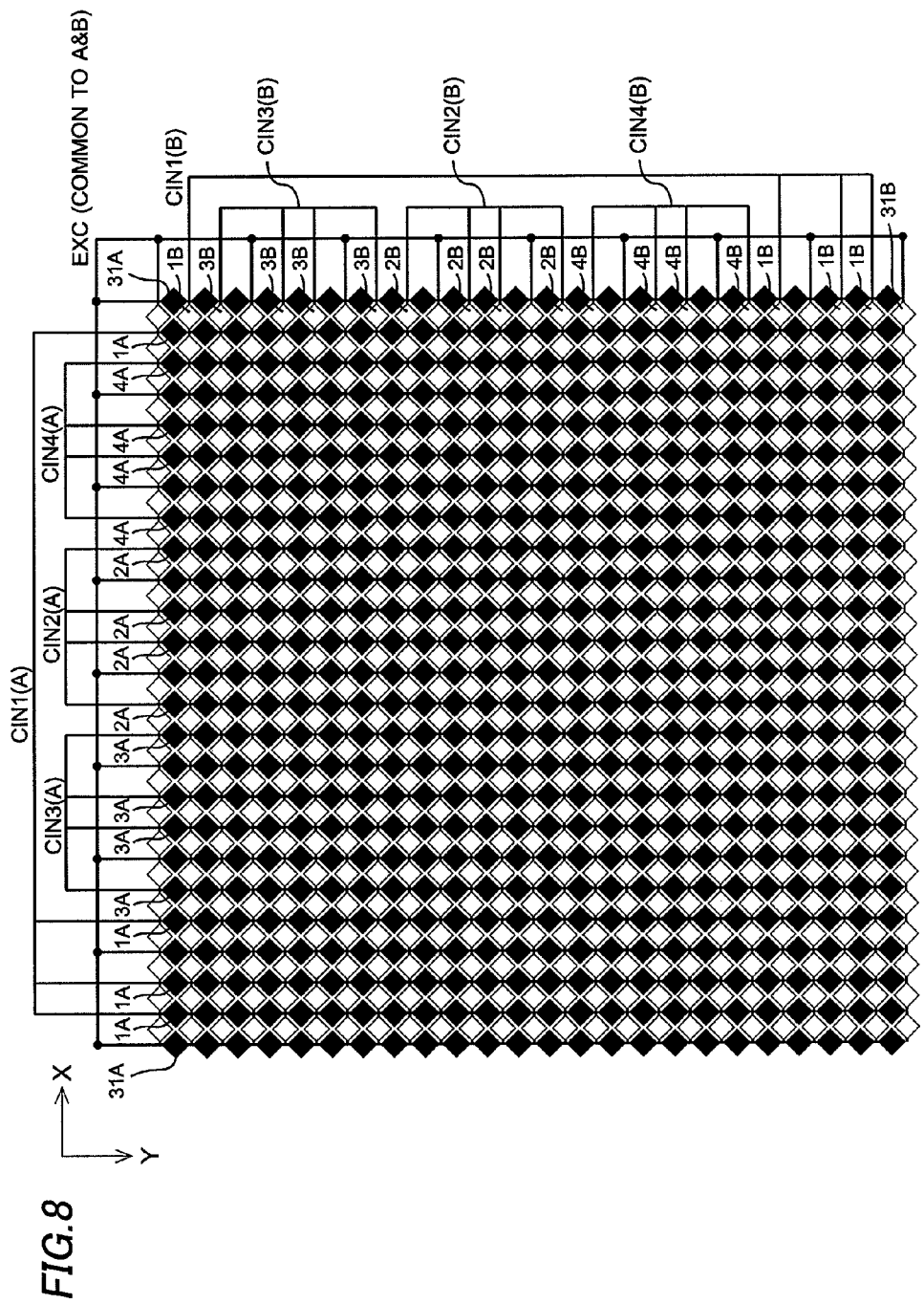
FIG. 8 shows a structure of a signal processing device of a touch panel according a sixth embodiment of this invention.
Figure 9:
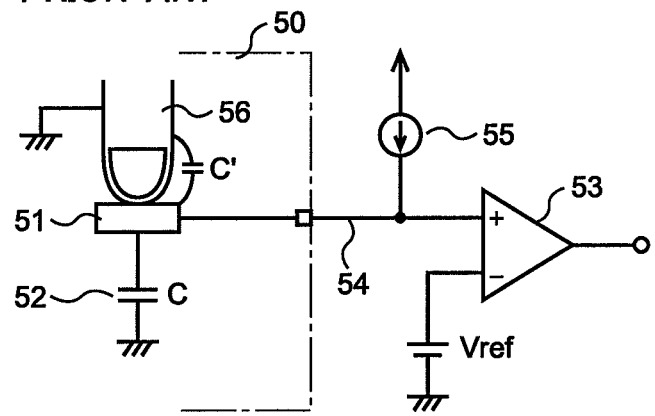
FIG. 9 shows a structure of a conventional touch sensor.
Figure 10:
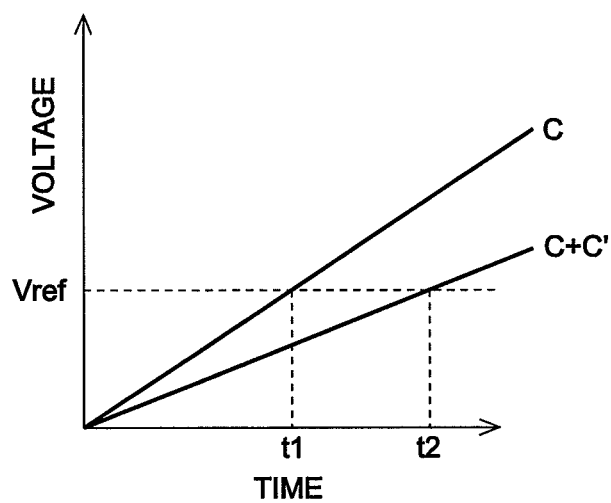
FIG. 10 is to explain operations of the conventional touch sensor.

A signal processing device of touch panel according to a sixth embodiment of this invention is a further improvement of the signal processing device of touch panel according to the fifth embodiment so that an integration density of the touch pads is increased. Each of the touch pads is shaped in a square and a corner of the square-shaped touch pad is connected to a corner of adjacent square-shaped touch pad of the same kind so that the touch pads of the same kind are connected in a string, as shown in FIG. 8. The same applies to the excitation pads 31A and 31B. Although the touch pads and the excitation pads are square-shaped in the explanation described above, they may be in any shape.

An array of first through eighth pairs of touch pads (1A, 1A), (1A, 3A), (3A, 3A), (3A, 2A), (2A, 2A), (2A, 4A), (4A, 4A), and (4A, 1A) and the excitation pads 31A are disposed so as to extend in a Y direction on a substrate.

Another array of first through eighth pairs of touch pads (1B, 1B), (1B, 3B), (3B, 3B), (3B, 2B), (2B, 2B), (2B, 4B), (4B, 4B), and (4B, 1B) and the excitation pads 31B are disposed parallel to each other and extending in an X direction on the substrate, Each of the touch pads in the array of first through eighth pairs of touch pads (1B, 1B), (1B, 3B), (3B, 3B), (3B, 2B), (2B, 2B), (2B, 4B), (4B, 4B), and (4B, 1B) extending in the X direction is interposed between adjacent touch pads in the array of first through eighth pairs of touch pads (1A, 1A), (1A, 3A), (3A, 3A), (3A, 2A), (2A, 2A), (2A, 4A), (4A, 4A), and (4A, 1A) extending in the X direction. As a result, an area of each of the touch pads can be increased, and a pad capacitance at each node can be made uniform.

Since the signal processing devices of touch panel according to the embodiments of this invention adopt the differential capacitance detection, the noise tolerance is improved and the influences of the parasitic capacitances of the touch pads and the wirings are removed so that no restriction is required on patterning of the touch pads and the like, enabling arbitrary patterning.

The location between the touch pads can be linearly detected based on the output voltage from the electric charge amplifier. As a result, a larger number of locations can be detected with a smaller number of touch pads to dramatically increase an amount of data that can be inputted.

What is claimed is:

1. A signal processing device of a touch panel comprising a first touch pad, a second touch pad and an excitation pad disposed between the first touch pad and the second touch pad, the signal processing device comprising:
    an alternating current power supply providing the excitation pad with an alternating voltage; and
    an electric charge amplifier generating a voltage corresponding to a difference between a first capacitance of a first capacitor formed between the first touch pad and the excitation pad and a second capacitance of a second capacitor formed between the second touch pad and the excitation pad.

2. The signal processing device of a touch panel of claim 1, further comprising an A/D converter converting an analog output of the electric charge amplifier into a digital output.

3. The signal processing device of a touch panel of claim 1, wherein the alternating voltage provided by the alternating current power supply is a clock signal voltage.

4. The signal processing device of a touch panel of claim 1, wherein the electric charge amplifier is configured to receive a first voltage from the first capacitance of the first capacitor formed between the first touch pad and the excitation pad and a second voltage from the second capacitance of the second capacitor formed between the second touch pad and the excitation pad to generate the voltage corresponding to a difference between the first voltage and the second voltage.

5. A signal processing device of a touch panel comprising a first touch pad, a second touch pad and an excitation pad disposed between the first touch pad and the second touch pad, the signal processing device comprising:

an alternating current power supply providing the excitation pad with an alternating voltage;

an electric charge amplifier generating a voltage corresponding to a difference between a first capacitance of a first capacitor formed between the first touch pad and the excitation pad and a second capacitance of a second capacitor formed between the second touch pad and the excitation pad; and a third capacitor and a fourth capacitor, wherein the electric charge amplifier comprises a differential amplifier comprising a first input terminal and a second input terminal, the first input terminal being connected to a connecting node between the first touch pad and the third capacitor, and the second input terminal being connected to a connecting node between the second touch pad and the fourth capacitor.

6. The signal processing device of a touch panel of claim 5, wherein a capacitance of the third capacitor is substantially equal to or smaller than the first capacitance, and a capacitance of the fourth capacitor is substantially equal to or smaller than the second capacitance.

7. A signal processing device comprising:

a touch panel comprising, a plurality of pairs of touch pads, each of the touch pads being a first kind of touch pad, a second kind of touch pad, a third kind of touch pad or a fourth kind of touch pad, and each of the pairs of touch pads comprising two touch pads of a single kind or two touch pads of two different kinds, and an excitation pad disposed between neighboring two of the pairs of touch pads; and a signal processing device of the touch panel comprising, an alternating current power supply providing the excitation pad with an alternating voltage, a selection circuit selecting in turn a combination of the first kind of touch pads and the second kind of touch pads and a combination of the third kind of touch pads and the fourth kind of touch pads, and an electric charge amplifier generating a voltage corresponding to a difference between a first capacitance of a first capacitor formed between the excitation pad and one kind of touch pads in the combination selected by the selection circuit and a second capacitance of a second capacitor formed between the excitation pad and the other kind of touch pads in the combination selected by the selection circuit.

8. The signal processing device of claim 7, wherein the selection circuit selects the combination of the first kind of touch pads and the second kind of touch pads in a first turn of selection and selects the combination of the third kind of touch pads and the fourth kind of touch pads in a second turn of selection.

9. The signal processing device of claim 7, wherein the plurality of pairs of touch pads comprises a first pair of touch pads comprising two of the first kind of touch pads, a second pair of touch pads comprising one of the first kind of touch pads and one of the third kind of touch pads, a third pair of touch pads comprising two of the third kind of touch pads, a fourth pair of touch pads comprising one of the third kind of touch pads and one of the second kind of touch pads, fifth pair of touch pads comprising two of the second kind of touch pads, sixth pair of touch pads comprising one of the second kind of touch pads and one of the fourth kind of touch pads, a seventh pair of touch pads comprising two of the fourth kind of touch pads and a eighth pair of touch pads comprising one of the fourth kind of touch pads and one of the first kind of touch pads.

10. The signal processing device of claim 7, wherein the plurality of pairs of touch pads is disposed to form a ring, a line or a matrix.

11. The signal processing device of claim 7, wherein the signal processing device of the touch panel further comprises an A/D converter converting an analog output of the electric charge amplifier into a digital output.

12. The signal processing device of claim 7, wherein the alternating voltage provided by the alternating current power supply is a clock signal voltage.

13. The signal processing device of claim 7, wherein the signal processing device of the touch panel comprises a third capacitor and a fourth capacitor, and the electric charge amplifier comprising a differential amplifier comprising a first input terminal and a second input terminal, the first input terminal being connected to a connecting node between the one kind of touch pads and the third capacitor, and the second input terminal being connected to a connecting node between the other kind of touch pads and the fourth capacitor.

14. The signal processing device of claim 13, wherein a capacitance of the third capacitor is substantially equal to or smaller than the first capacitance, and a capacitance of the fourth capacitor is substantially equal to or smaller than the second capacitance.

15. A signal processing device comprising:

a touch panel comprising, a plurality of pairs of touch pads, each of the touch pads being one of n kinds of touch pads, n being an even integer equal to or larger than four, and each of the pairs of touch pads comprising two touch pads of a single kind or two touch pads of two different kinds, and an excitation pad disposed between neighboring two of the pairs of touch pads; and a signal processing device of the touch panel comprising, an alternating current power supply providing the excitation pad with an alternating voltage, a selection circuit selecting in turn two kinds of touch pads as a combination out of predetermined n/2 combinations of n kinds of touch pads, each of the n/2 combinations of touch pads comprising two of the n kinds of touch pads, and an electric charge amplifier generating a voltage corresponding to a difference between a first capacitance of a first capacitor formed between the excitation pad and one kind of touch pads in the combination selected by the selection circuit and a second capacitance of a second capacitor formed between the excitation pad and the other kind of touch pads in the combination selected by the selection circuit.

16. The signal processing device of claim 15, wherein the signal processing device of the touch panel comprises a third capacitor and a fourth capacitor, and the electric charge amplifier comprising a differential amplifier comprising a first input terminal and a second input terminal, the first input terminal being connected to a connecting node between the one kind of touch pads and the third capacitor, and the second input terminal being connected to a connecting node between the other kind of touch pads and the fourth capacitor.

17. The signal processing device of claim 16, wherein a capacitance of the third capacitor is substantially equal to or smaller than the first capacitance, and a capacitance of the fourth capacitor is substantially equal to or smaller than the second capacitance.

18. The signal processing device of claim 15, wherein the signal processing device of the touch panel further comprises an A/D converter converting an analog output of the electric charge amplifier into a digital output.

19. The signal processing device of claim 15, wherein the alternating voltage provided by the alternating current power supply is a clock signal voltage.

* * * * *